United States Patent
Whiting et al.

(10) Patent No.: US 7,694,518 B2
(45) Date of Patent: Apr. 13, 2010

(54) INTERNAL COMBUSTION ENGINE SYSTEM HAVING A POWER TURBINE WITH A BROAD EFFICIENCY RANGE

(75) Inventors: Todd Mathew Whiting, Waterloo, IA (US); Carl Thomas Vuk, Denver, IA (US)

(73) Assignee: Deere & Company, Moline, IL (US)

( * ) Notice: Subject to any disclaimer, the term of this patent is extended or adjusted under 35 U.S.C. 154(b) by 281 days.

(21) Appl. No.: 11/838,645

(22) Filed: Aug. 14, 2007

(65) Prior Publication Data

US 2009/0047121 A1 Feb. 19, 2009

(51) Int. Cl.
*F02D 23/00* (2006.01)
*F03D 1/04* (2006.01)
*F03B 3/16* (2006.01)
*F03B 1/00* (2006.01)

(52) U.S. Cl. .................. 60/602; 415/116; 415/120; 415/151; 415/184; 415/186; 415/208.3; 415/208.5; 415/211.1

(58) Field of Classification Search ............ 60/602; 415/120, 151, 156, 159, 116, 184, 185, 186, 415/205, 208.3, 208.5, 211.1
See application file for complete search history.

(56) References Cited

U.S. PATENT DOCUMENTS

| 94,868 | A | | 9/1869 | Chase | |
|---|---|---|---|---|---|
| 3,137,477 | A | | 6/1964 | Kofink | |
| 3,552,876 | A | * | 1/1971 | Updike | 415/205 |
| 4,008,572 | A | | 2/1977 | Woollenweber, Jr. | |
| 4,389,845 | A | * | 6/1983 | Koike | 60/602 |
| 4,512,714 | A | | 4/1985 | Kaesser | |
| 4,565,068 | A | * | 1/1986 | Schneider | 60/602 |
| 4,781,528 | A | | 11/1988 | Hagita et al. | |
| 6,073,447 | A | * | 6/2000 | Kawakami et al. | 60/602 |
| 2006/0230759 | A1 | * | 10/2006 | Semrau | 60/602 |
| 2007/0209361 | A1 | * | 9/2007 | Pedersen et al. | 60/602 |
| 2008/0022679 | A1 | * | 1/2008 | Hara et al. | 60/602 |

OTHER PUBLICATIONS

Kawaguchi, J. et al. Development of VFT (Variable Flow Turbocharger). SAE International. International Congress and Exposition. Detroit, Michigan. Mar. 1-4, 1999. SAE Technical Paper Series 1999-01-1242.

* cited by examiner

*Primary Examiner*—Thomas E Denion
*Assistant Examiner*—Mary A Davis

(57) ABSTRACT

An engine system incorporating an air breathing, reciprocating internal combustion engine having an inlet for air and an exhaust for products of combustion. A centripetal turbine receives products of the combustion and has a housing in which a turbine wheel is rotatable. The housing has first and second passages leading from the inlet to discrete, approximately 180°, portions of the circumference of the turbine wheel. The passages have fixed vanes adjacent the periphery of the turbine wheel and the angle of the vanes in one of the passages is different than those in the other so as to accommodate different power levels providing optimum approach angles between the gases passing the vanes and the blades of the turbine wheel. Flow through the passages is controlled by a flapper valve to direct it to one or the other or both passages depending upon the load factor for the engine.

24 Claims, 3 Drawing Sheets

INTERNAL COMBUSTION ENGINE SYSTEM HAVING A POWER TURBINE WITH A BROAD EFFICIENCY RANGE

GOVERNMENT RIGHTS IN PATENT

This invention was made with government support under contract no. DE-FC26-05NT42422 awarded by the Department of Energy. The United States government has certain rights in this invention.

FIELD OF THE INVENTION

The present invention relates to internal combustion engine systems and more specifically to engines having power turbines incorporated in the system.

BACKGROUND OF THE INVENTION

The first turbocharger was proposed by Alfred Buchi in 1905. The turbocharger began as a device to capture energy that was wasted in the exhaust system of a naturally aspirated engine by passing exhaust gases over a series of blades on a turbine wheel to produce a rotary power output. The turbine was connected to and drove a compressor to increase the charge density of an engine and therefore the power output. Since 1905, immense strides have been made in the turbo machinery field to improve the efficiency, flexibility and durability of individual components. A key element in the quest for efficiency is the turbine. In the most common commercial form, the turbine consists of a centripetal turbine wheel having a radial entry receiving heated gases from a turbine nozzle and accelerating them and extracting energy to drive either a compressor or other power load device. Strides have been made in metallurgy to enable higher operating temperatures and higher rpm's. Concurrent with these advances was the attempt to operate the turbine at maximum efficiency over a range of operating conditions.

A major impediment to maintaining efficiency over a broader range of operating conditions is a result of the incident angle with which the exhaust or heated gas flow is introduced to the periphery of the turbine wheel. The turbine is typically designed for maximum efficiency at full load conditions at rated speed. However, when the load drops off to for example 25%, a turbine with a rated efficiency of 80% can easily drop to an efficiency of 25%. This is primarily due to an incident angle that is not optimum for the part throttle conditions. The drop in efficiency significantly impacts part load performance characteristics of an engine system with which it is used and may ultimately influence the ability to flow air required for clean combustion characteristics.

Attempts have been made to accommodate this condition by incorporating a ring of variable angle vanes around the periphery of the turbine wheel. The vanes are pivoted to change their angle with respect to the wheel and to vary the throat area for gases entering the wheel to increase gas velocity during part load engine conditions. However, such systems have been proven to questionable reliability, given the carbon laden nature of the gases passing through it and the requirement for a large plurality of vanes to be pivoted in precise unison.

Therefore, what is needed in the art is a simple and effective power turbine having a broad range of efficiency characteristics.

SUMMARY OF THE INVENTION

In one form, the invention is a centripetal turbine having a housing with an inlet for high velocity gases and an outlet. The turbine wheel is rotatable in the housing and has a plurality of blades extending at least radially inward from the turbine wheel periphery. The housing has first and second passages leading from the inlet to discrete and separate portions around the periphery of the turbine wheel. The housing has fixed vanes in the passages adjacent the periphery of the turbine wheel and has a device to selectively permit flow through the first passage, second passage and both passages.

In another form the invention is an internal combustion engine system having an air breathing reciprocating internal combustion engine having an inlet for air and an exhaust for products of combustion. At least one centripetal turbine receives products of combustion in the form of high velocity gases from the exhaust and the turbine has a housing with an inlet receiving the high velocity gases and an outlet. A turbine wheel is rotatable in the housing and has a plurality of blades extending at least radially inward from the turbine wheel periphery. The housing has first and second passages leading from the inlet to discrete and separate portions around the periphery of the turbine wheel. The housing has fixed vanes in the passages adjacent the periphery of the turbine wheel and has a device to selectively permit flow through the first passage, the second passage and both passages.

DETAILED DESCRIPTION OF THE INVENTION

Figure 1:
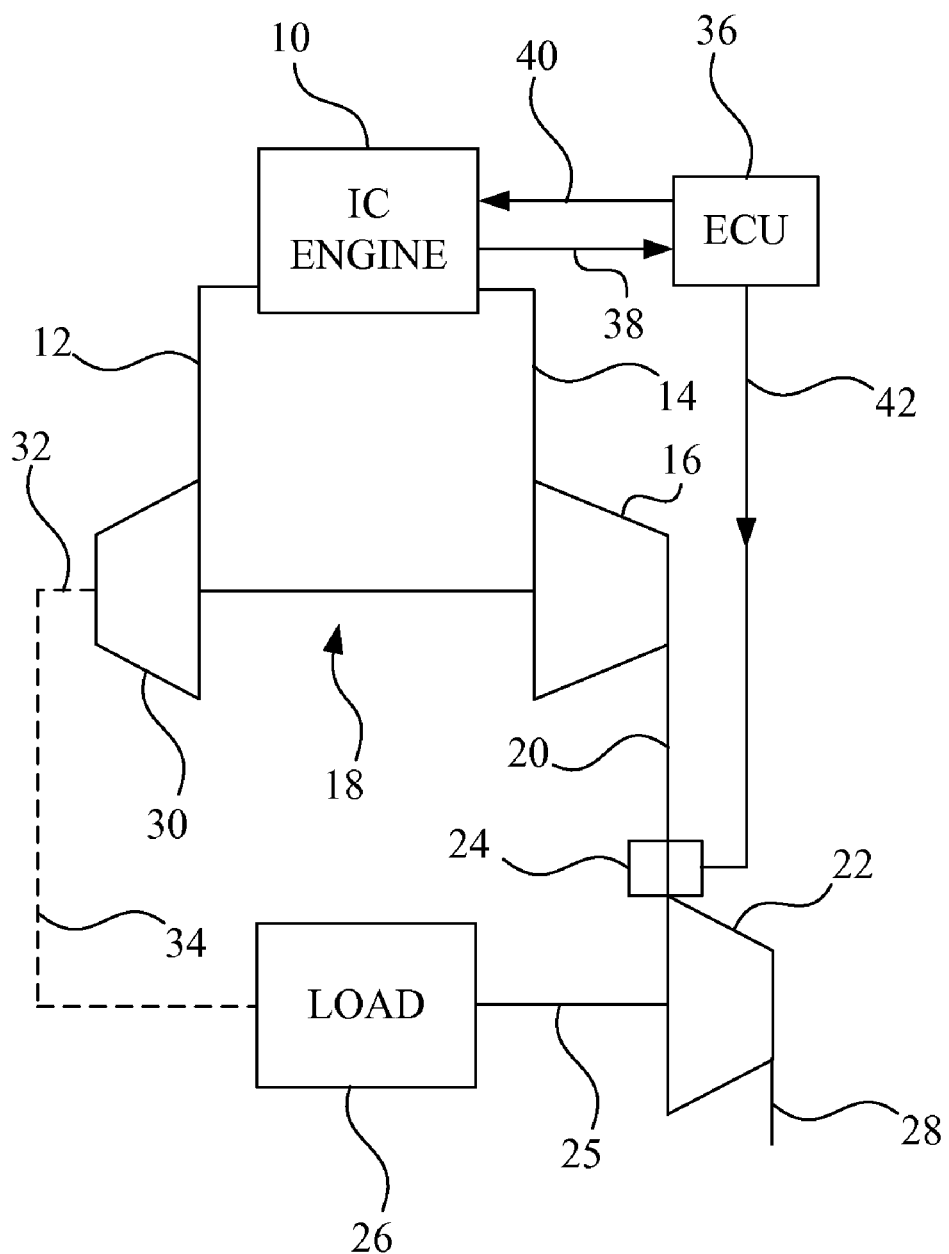
FIG. 1 is a schematic drawing of an internal combustion engine system incorporating a power turbine of the present invention.

FIG. 1 shows an internal combustion engine system including an engine 10 producing a power output. Engine 10 may be provided in many different forms but, for the purposes of illustrating the invention, it is described as a reciprocating, air breathing internal combustion engine in which air is received from an inlet 12 and compressed in a cylinder or combustion chamber. Fuel is either mixed with the air prior to entry or within the combustion chamber. The resultant mixture is either ignited by an external source, such as a spark ignition, or by the heat of compression of the air, as in a diesel engine. Further combinations may be provided, such as homogenous charge compression ignition engines. It should be apparent to those skilled in the art that many different internal combustion engine types may be employed with the present invention.

The products of combustion from engine 10 are delivered to an exhaust 14 and from there to a turbine 16 of a turbocharger, generally indicated by reference character 18. The details of construction for turbocharger 18 are omitted to enable a clearer understanding of the present invention. It should be apparent to those skilled in the art that turbocharger 18 would have a bearing system for journaling a shaft (not shown) on which turbine 16 is mounted and a lubrication and cooling system for the bearings.

The gases, which still retain energy, are passed from turbine 16 via a conduit 20 to a power turbine 22 embodying the present invention. A variable geometry valve 24, to be described below, is positioned at the inlet of turbine 22. Turbine 22 may be referred to as a power turbine in that it provides a rotary output 25 to power a load generally indicated at 26. The final gas products are delivered by a conduit 28 to an appropriate exhaust aftertreatment system (not shown) before delivery to the atmosphere.

The load 26 may be one of a number of loads. In one form, the load may be a turbo generator which is used to extract additional energy from the exhaust stream for coupling directly to the output of the internal combustion engine 10 or by driving engine accessories, thereby increasing the overall efficiency of engine 10. In another optional form, the load 26 may be a compressor which is used to pre-pressurize air for delivery to the engine intake. In still another form, depending upon the duty cycle of the engine system, the power turbine 22 may be used to drive a compressor and replace the turbocharger 18 in the engine system.

The turbine 16 of turbocharger 18 drives a centrifugal compressor 30 that receives intake air from a suitable, filtered intake system 32 and pressurizes it for delivery to engine intake 12. If load 26 is a compressor, its output is coupled by dashed lines 34 to the intake 32 for compressor 30.

Overall control of the internal combustion engine system is provided by an ECU 36 receiving operating parameter signal inputs from line, or lines, 38 and controlling devices such as a fuel injection system via a line, or lines, 40 to achieve demanded engine power with maximum efficiency and minimum emissions. The ECU 36 also provides a control signal via line 42 to the variable geometry valve 24 as described below.

Figure 2:
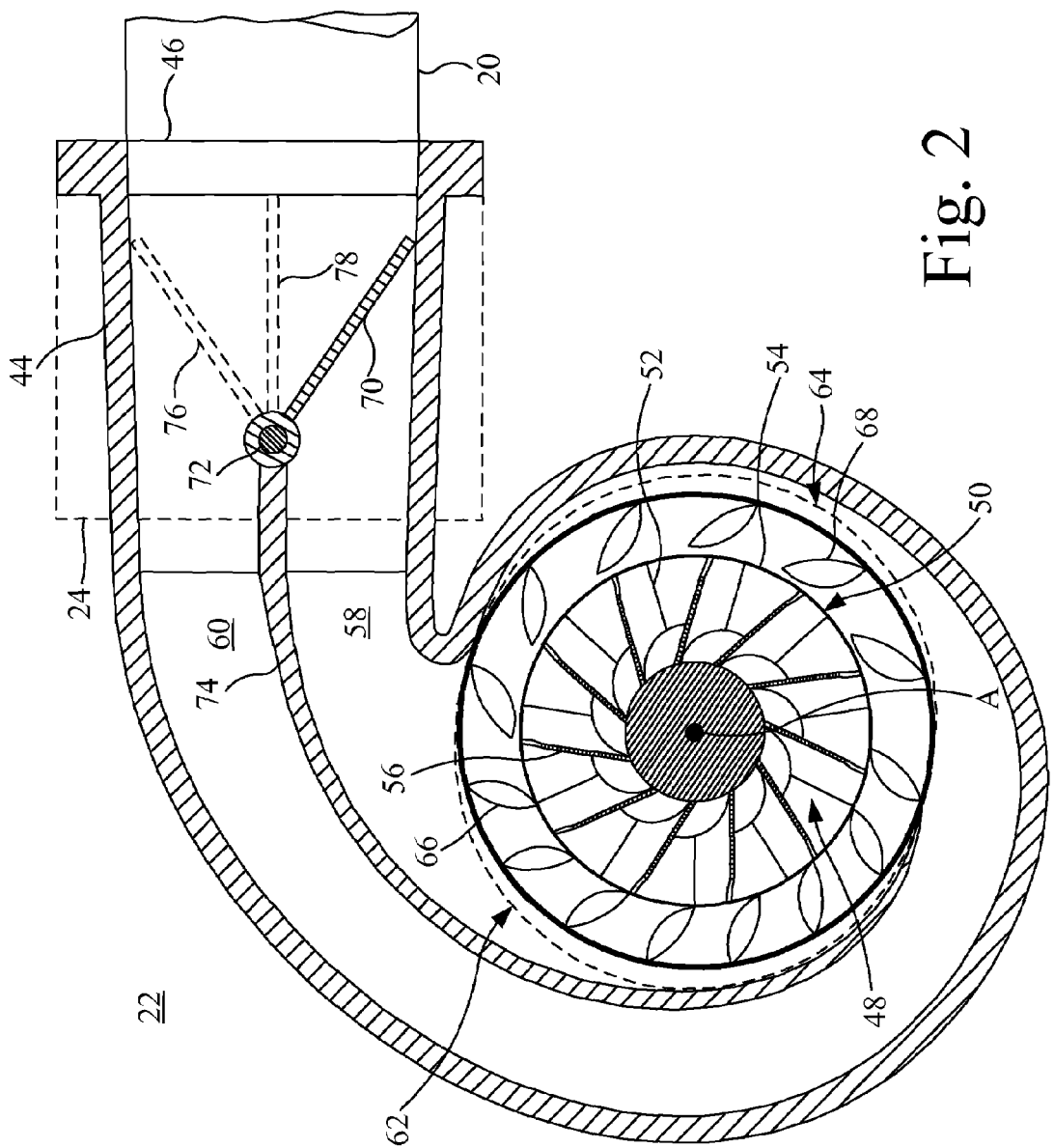
FIG. 2 is a cross sectional view of the power turbine shown schematically in FIG.

The turbine shown in FIG. 2 includes a housing 44 having an inlet 46 receiving high velocity gases from conduit 20 and an outlet generally indicated by 48 for gases exiting in a direction that is perpendicular to the plane of FIG. 2. Housing 44 is formed from appropriate materials designed to accommodate the temperature of gases that are commonly experienced by turbines used in internal combustion engine systems. Turbine 22 has a turbine wheel 50 which is a centripetal turbine journaled for rotation about a central axis A by an appropriate bearing system, not shown to enable a clearer understanding of the invention. Turbine wheel 50 has a plurality of blades 52, usually integral with and extending radially inward from the periphery 54 of turbine wheel 50. The blades 52 then make a transition through an axial exducer section 56 for final discharge from the turbine housing 44. A first passage 58 and second passage 60 extend in volute fashion around the periphery 54 of turbine wheel 50. Passage 58 has a discrete entry 62 around the periphery 54 and passage 60 has a second discrete entry 64 around the periphery 54. As illustrated herein, the entries 62 and 64 are each about 180 degrees of the periphery but the ratio between the two may be unequal for a particular application. A plurality of vanes 66 are positioned within passage 58 adjacent the periphery 54 of wheel 50 and a plurality of vanes 68 are positioned in passage 60 adjacent the periphery 54 of turbine wheel 50.

The variable geometry device 24 is illustrated as a flapper valve 70 having a hinged mounting 72 adjacent the upstream end of a wall 74 dividing passages 60 and 58 and at the downstream or trailing edge of valve 70. Flapper valve 70 is pivotable between three positions, the first of which is shown in solid form in FIG. 2 wherein flow through passage 58 is blocked and flow through passage 60 is permitted. A second position, shown by dashed lines 76 blocks flow through passage 60 but permits flow through passage 58. A third position, indicated by dashed lines 78, permits flow through both passages 58 and 60 to the periphery 54 of the turbine wheel 50.

Figure 3:
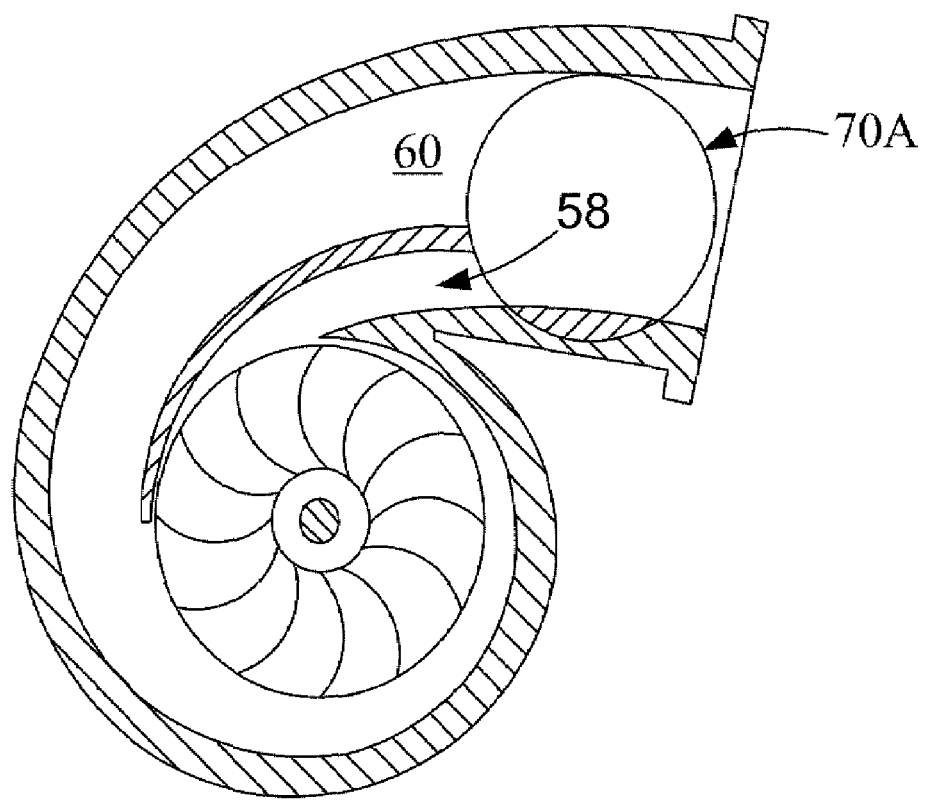
FIG. 3 is a cross sectional view of the power turbine of FIG. 1 showing an alternative valve.

An alternative to the flapper valve 70 is a rotary valve 70a, shown in FIG. 3, disclosed in U.S. Pat. No. 4,512,714, of common assignment with the present invention. Rotary valve 70a would rotatably pivot between 3 positions, one of which would permit flow only through passage 58. Another position would permit flow only through passage 60 and a third would permit flow through both passages 58 and 60.

The entry of the passageways 58 and 60 to the periphery of the turbine wheel 54 preferably are of different flow areas with the flow area of passage 58 being lower than that for passage 60. Furthermore, the angle the vanes 66 make with radial lines drawn from center axis A is lower than the angle the vanes 68 in passage 60 make with the same radial lines from the same center axis A. The vane angles and flow areas for each passage are designed to provide optimum approach angles for flow at different power levels. For example, the vane angle and flow area through passage 58 may be optimized for 25% load and the vane angle and flow area through passage 60 would be optimized for a load of 75%. It should be apparent to those skilled in the turbomachinery art that vane angles and flow areas may be readily selected to optimize flow with that ratio or other ratios as needed for the ultimate duty cycle of the turbine 22.

In operation, the flapper valve 70 would be maintained in position 76 by an appropriate mechanical control input from line 42 for operation at 25% load. When the load is at, or about, 75%, the flapper valve 70 is moved by another control input from line 42 to the position shown in solid lines to direct flow through the passage 60. When the load is at, or approaches, full load, the flapper valve 70 is placed in position 78 by another control input from line 42 to permit flow through both passages 58 and 60. Although in the full load position, the efficiency of the turbine is less than optimum, it is more than made up for by increases in efficiency at part load conditions.

Engine systems that spend more time at part load than at full load particularly benefit from the power turbine of the present invention. When the turbine 22 drives a load 26 in the form of a turbo generator, part load performance will be significantly improved by adding better performance over a broad area of the operating envelope. This improvement would be greatest with lower duty cycle applications such as trucks and smaller agricultural tractors.

Having described the preferred embodiment, it will become apparent that various modifications can be made without departing from the scope of the invention as defined in the accompanying claims.

The invention claimed is:
1. A centripetal turbine comprising:
a housing having an inlet for high velocity gases and an outlet;
a turbine wheel rotatable in said housing, said turbine wheel having a plurality of blades extending at least radially inward from the turbine wheel periphery;
said housing having first and second passages leading from the inlet to discrete and separate portions around the periphery of said turbine wheel;
said housing having fixed vanes in said passages adjacent the periphery of said turbine wheel wherein said fixed vanes in said first and second passages have different angles with respect to said turbine housing; and said housing having a device to selectively permit flow through said first passage, said second passage and both passages.

2. A centripetal turbine as claimed in claim 1, wherein said first and second passages are circumferentially spaced from one another.

3. A centripetal turbine as claimed in claim 2, wherein said first and second passages each occupy about 180° of the periphery of said turbine wheel.

4. A centripetal turbine as claimed in claim 1, wherein said first and second passages have unequal flow area.

5. A centripetal turbine as claimed in claim 1, wherein said passages are circumferentially spaced around the periphery of said turbine wheel with the first passage being closer to said inlet and the vanes in the first passage have an angle that is closer to the radial direction than the angle of the vanes in the second passage.

6. A centripetal turbine wheel as claimed in claim 1, wherein said device for selectively permitting flow is a flapper valve.

7. A centripetal turbine as claimed in claim 6, wherein said flapper valve comprises a trailing edge pivotal downstream of a leading edge and said flapper valve is pivotal between three positions, one of which blocks flow to the first passage, another of which blocks flow to the second passage and a third position in between the first and second positions to permit flow through both said first and second passages.

8. A centripetal turbine as claimed in claim 1, wherein said selected flow device comprises a rotary valve pivotable about its axis to selectively permit flow through said first passage, said second passage and both passages.

9. A centripetal turbine as claimed in claim 1, wherein said turbine wheel blades have axial outlet portions extending from and connected with the inlet portions said turbine blades.

10. A centripetal turbine as claimed in claim 1, further comprising a load driven by said turbine.

11. A centripetal turbine as claimed in claim 10, wherein said load is a compressor for pressurizing fluid.

12. A centripetal turbine as claimed in claim 11, wherein said load is a generator driven by said turbine.

13. An internal combustion engine system comprising:
an air breathing reciprocating internal combustion engine having an inlet for air and an exhaust for products of combustion;
at least one centripetal turbine receiving products of combustion in the form of high velocity gases from said exhaust, said turbine comprising:
a housing having an inlet receiving said high velocity gases and an outlet;
a turbine wheel rotatable in said housing, said turbine wheel having a plurality of blades extending at least radially inward from the turbine wheel periphery;
said housing having first and second passages leading from the turbine inlet to discrete and separate portions around the periphery of said turbine wheel;
said housing having fixed vanes in said passages adjacent the periphery of said turbine wheel wherein said fixed vanes in said first and second passages have different angles with respect to said turbine housing; and
said housing having a device to selectively permit flow through said first passage, said second passage and both passages.

14. A centripetal turbine as claimed in claim 13, wherein said first and second passages are circumferentially spaced from one another.

15. A centripetal turbine as claimed in claim 14, wherein said first and second passages each occupy about 180° of the periphery of said turbine wheel.

16. A centripetal turbine as claimed in claim 13, wherein said first and second passages have unequal flow area.

17. A centripetal turbine as claimed in claim 13, wherein said passages are circumferentially spaced around the periphery of said turbine wheel with the first passage being closer to said inlet and the vanes in the first passage have an angle that is closer to the radial direction than the angle of the vanes in the second passage.

18. A centripetal turbine wheel as claimed in claim 13, wherein said device for selectively permitting flow is a flapper valve.

19. A centripetal turbine as claimed in claim 18, wherein said flapper valve comprises a trailing edge pivotal downstream of a leading edge and said flapper valve is pivotal between three positions, one of which blocks flow to the first passage, another of which blocks flow to the second passage and a third position in between the first and second positions to permit flow through both said first and second passages.

20. A centripetal turbine as claimed in claim 13, wherein said selected flow device comprises a rotary valve pivotable about its axis to selectively permit flow through said first passage, said second passage and both passages.

21. A centripetal turbine as claimed in claim 13, wherein said turbine wheel blades have axial outlet portions extending from and connected with the inlet portions said turbine blades.

22. A centripetal turbine as claimed in claim 13, further comprising a load driven by said turbine.

23. A centripetal turbine as claimed in claim 22, wherein said load is a compressor for pressurizing fluid.

24. A centripetal turbine as claimed in claim 22, wherein said load is a generator driven by said turbine.

* * * * *